United States Patent Office 2,806,066
Patented Sept. 10, 1957

2,806,066
MANUFACTURE OF BIS-(β-HYDROXYALKYL-) POLYSULFIDES

Georg Spielberger, Leverkusen-Bayerwerk, and Wilhelm Krey, Krefeld-Uerdingen, Germany, assignors to Farbenfabriken Bayer Aktiengesellschaft, Leverkusen, Germany, a corporation of Germany No Drawing. Application March 18, 1953, Serial No. 343,240

Claims priority, application Germany March 22, 1952

5 Claims. (Cl. 260—608)

This invention relates to bis-(β-hydroxyalkyl-)polysulfides and is more particularly concerned with an improved process for preparing bis-(β-hydroxyalkyl-)polysulfides.

It is well known to produce bis-(β-hydroxyalkyl-)polysulfides by reacting alkylene chlorhydrins with alkali- or earth-alkali polysulfides in an aqueous medium. The bis-(β-hydroxyalkyl-)polysulfides obtained in the reaction separate from the resulting alkali chloride- or earth-alkali chloride solution in the form of viscous oils, the degree of the separation depending upon the concentration of the aqueous solution. It is, therefore, necessary to start from very concentrated alkylene chlorhydrin solutions which cannot directly be prepared from the corresponding olefin and chlorine in the presence of water, but only by reacting the corresponding alkylene oxide with hydrochloric acid.

If, on the other hand, the quantity of the solvent (water), used in the known method, is reduced to such an extent that the alkali- or earth-alkali chloride formed as a by-product partially crystallizes out, a further difficulty arises, viz. the separation of the precipitated inorganic salt from the viscous reaction product, an operation involving loss of product.

It is an object of the present invention to provide an improved process for preparing bis-(β-hydroxyalkyl-)polysulfides. Another object is to provide a process for the production of bis-(β-hydroxyalkyl-)polysulfides, whereby good yields are obtained. Further objects will appear as the specification proceeds.

These objects are attained in accordance with the present invention by reacting a 1,2-alkylene oxide with an alkali- or earth-alkali polysulfide and neutralizing the base liberated in the reaction in such a manner that the inorganic polysulfide serving as one of the reactants is not decomposed to hydrogen sulfide and sulfur.

This neutralization can be effected by adding to the reaction mixture the calculated amount of any suitable alkali-binding substance, such as carbon dioxide, sodium bicarbonate, buffer solutions containing acetates, borates, phosphates and the like, and mineral acids if introduced carefully enough to preclude a decomposition of the alkali- or earth-alkali polysulfide.

A preferred method of carrying out our invention comprises reacting 1,2-alkylene oxides with sodium polysulfide and neutralizing the sodium hydroxide liberated in the reaction with carbon dioxide at the rate as it is formed. When ethylene oxide is used as an alkylene oxide the reaction occurring in accordance with this embodiment of our invention may be written as follows:

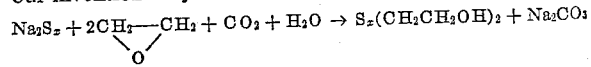

By simultaneously introducing stoichiometric proportions of alkylene oxide and carbon dioxide into the solution of sodium polysulfide over-acidifying can be avoided. A further advantage of this method resides in the fact that sodium carbonate is much more soluble in water than sodium chloride formed in the known process, so that very concentrated aqueous solutions can be handled without any difficulty arising from precipitated sodium chloride.

1,2-alkylene oxides suitable for the process of our invention include ethylene oxide, propylene oxide, 3-hydroxypropylene-oxide-1,2 and the like.

The temperatures which have been found most satisfactory for the reaction according to our invention range from about 30 to about 90° C., but the method may be carried out at higher or lower temperatures, if desired. The alkylene oxide is introduced into the reaction mixture either in the gaseous or in the liquid form. In general, the reaction occurs very readily, so that superatmospheric pressure is unnecessary. The alkali-binding substance is suitably added along with the alkylene oxide as stated hereinabove. If carbon dioxide is used as the alkali-binding substance one mol is introduced for two mols of alkylene oxide (see the above equation). Carbon dioxide and ethylene oxide, when employed as reactants, may be mixed in this ratio before being added to the solution of the inorganic polysulfide.

The process in accordance with the invention makes it possible to obtain good yields of bis-(β-hydroxyalkyl-)polysulfides. This finding is very surprising as alkylene oxides are readily hydrolyzed in an aqueous alkaline medium and are apt to form polyethers. However, these side-reactions do not occur to an appreciable extent in our process.

The bis-(β-hydroxyalkyl-)polysulfides which have become easily obtainable by the present invention are mixtures of individual compounds containing a different number of sulfur atoms, the degree of sulfuration depending upon the proportion of sulfur present in the inorganic polysulfide employed as a starting material.

The bis-(β-hydroxyalkyl-)polysulfides prepared in accordance with this invention are useful as intermediates for the manufacture of dyes, pharmaceuticals and agricultural chemicals.

The following examples serve to illustrate our invention without in any way limiting it:

Example 1

A mixture of 2 parts by volume of ethylene oxide and 1 part by volume of carbon dioxide is introduced into a solution of 260 parts by weight of 60 percent sodium sulfide and 70 parts by weight of sulfur in 500 parts by weight of water until the aqueous layer has become almost colorless. This stage is arrived at after about 176 parts by weight of ethylene oxide and 88 parts by weight of carbon dioxide have been taken up. During the introduction of the gases the mixture is vigorously agitated and the temperature is held in the range from 50 to 80° C. by cooling. On introduction of the gases the mixture is kept for some time at the reaction temperature. The reaction mixture is worked up by separating the layers at moderately elevated temperature. On cooling sodium carbonate-decahydrate ($Na_2CO_3.10H_2O$) precipitates. The mother lye retains a small proportion of bis-(hydroxyethyl-)polysulfide and can be used for the next run.

The reddish-yellow oily layer (355 parts by weight) comprises the bis-(hydroxyethyl-)polysulfide formed in the reaction.

Sulfur content: 33 percent. Refractive index:

$$n_4^{21}: 1.4948$$

Example 2

26 kilograms of ethylene oxide and 13 kilograms of carbon dioxide are added with stirring at a temperature of 40 to 50° C. and over a period of 14 hours to a solution of 10 kilograms of sulfur and 70 kilograms of sodium sulfide (30 percent) in 40 liters of water. On separation of the layers 51 kilograms of crude bis-(hydroxyethyl-)polysulfide are obtained. A further quantity of 3 kilograms of bis-(hydroxyethyl-)polysulfide may be obtained by extracting the aqueous layer with butanol. On drying the bis-(hydroxyethyl-)polysulfide contains 42.8 percent of sulfur. By catalytic hydrogenation of the polysulfide in the presence of a suitable catalyst 75 percent of monothioglycol (based on ethylene oxide consumed) is obtained.

*Example 3*

90 grams of ethylene oxide are introduced with stirring at 30–50° C. over a period of 6 hours into a solution of 240 grams of crystalline sodium sulfide (30 percent) and 36 grams of sulfur in 100 ccm. of water. Simultaneously and uniformly 450 grams of 20 percent sulfuric acid are added dropwise at a vigorously agitated point of the reaction mixture below the surface. Crude bis-(hydroxyethyl-)polysulfide is obtained yielding on catalytic hydrogenation 70 percent of the theoretical (based on ethylene oxide consumed) of thioglycol.

We claim:

1. A process for preparing bis-($\beta$-hydroxyalkyl-)polysulfides which comprises reacting, in the presence of water, 1,2-alkylene oxides with alkali metal polysulfides while simultaneously adding an alkali-binding substance to neutralize the liberated alkali-metal hydroxide as it is formed.

2. The process of claim 1 wherein the neutralization is effected with carbon dioxide.

3. A process for preparing bis-($\beta$-hydroxyalkyl-)polysulfides which comprises introducing stoichiometric amounts of carbon dioxide and of a 1,2-alkylene oxide into an aqueous solution of an alkali-metal polysulfide.

4. A process for preparing bis-($\beta$-hydroxyalkyl-)polysulfides which comprises introducing stoichiometric amounts of carbon dioxide and a 1,2-alkylene oxide into an aqueous solution of sodium polysulfide.

5. The process of claim 4 wherein, instead of sodium polysulfide, a mixture of sodium monosulfide and sulfur is employed.

References Cited in the file of this patent

UNITED STATES PATENTS

| | | |
|---|---|---|
| 2,257,290 | Voorhees | Sept. 30, 1941 |
| 2,527,378 | Bertozzi | Oct. 24, 1950 |